US005301921A

United States Patent [19]

Kumar

[11] Patent Number: 5,301,921

[45] **Date of Patent: * Apr. 12, 1994**

[54] PROPORTIONAL ELECTROPNEUMATIC SOLENOID-CONTROLLED VALVE

[75] Inventor: Viraraghavan S. Kumar, Palm Bay, Fla.

[73] Assignee: Puritan-Bennett Corp., Kans.

[ * ] Notice: The portion of the term of this patent subsequent to Sep. 4, 2007 has been disclaimed.

[21] Appl. No.: 575,943

[22] Filed: Aug. 31, 1990

Related U.S. Application Data

[63] Continuation of Ser. No. 360,429, Jun. 2, 1989, Pat. No. 4,954,799.

[51] Int. Cl.[5] .......... F16K 31/06; H01F 7/13

[52] U.S. Cl. .......... 251/129.08; 251/129.17; 251/129.18; 335/236; 335/258; 335/262

[58] Field of Search .......... 251/129.08, 129.07; 335/258, 262, 269, 273, 236

[56] References Cited

U.S. PATENT DOCUMENTS 3,250,293 5/1966 Adams et al. .......... 251/129.08 X
3,900,822 8/1975 Hardwick et al. .......... 335/262 X
4,442,998 4/1984 Ohyama et al. .......... 251/129.08
4,463,332 7/1984 Everett .......... 335/258
4,635,683 1/1987 Nielsen .......... 251/129.08 X
4,767,097 8/1988 Everett et al. .......... 251/129.08

*Primary Examiner*—Arnold Rosenthal
*Attorney, Agent, or Firm*—Charles E. Wands

[57] ABSTRACT

A rectilinear motion proportional solenoid assembly includes a cylindrical housing containing an electromagnetic coil having a longitudinal coaxial bore. The housing contains magnetic material for providing a flux path for the magnetic field produced by the coil. A generally cylindrical magnetic pole piece element is inserted into the bore and a movable armature assembly of magnetic material is supported within the bore for movement along the longitudinal axis of the coil by a pair of thin, flexible suspension springs. One of the springs is located within the bore adjacent to one end of the magnetic pole piece whereat an axial gap between the pole piece and the armature is formed. A second spring is located within the housing within the vicinity of a radial air gap between the armature and the housing. The pole piece contains an auxiliary region adjacent to the axial air gap for shunting a portion of the axially directed magnetic flux, for effectively causing the force imparted to the movable armature by the application of a current to the electromagnetic coil to be substantially constant irrespective of the magnitude of the axial gap for a variation in the axial gap over a prescribed range.

17 Claims, 9 Drawing Sheets

PROPORTIONAL ELECTROPNEUMATIC SOLENOID-CONTROLLED VALVE

This is a continuation of application Ser. No. 360,429, filed Jun. 2, 1989, now U.S. Pat. No. 4,954,799, issued Sep. 4, 1990.

FIELD OF THE INVENTION

The present invention relates in general to solenoid-operated fluid control valves and is particularly directed to the configuration of the valve and its associated displacement control solenoid structure through which fluid flow is precisely proportionally controlled in response to the application of a low D.C. input current.

BACKGROUND OF THE INVENTION

Precision fluid flow control devices, such as fuel supply units for aerospace systems and oxygen/air metering units employed in hospitals, typically incorporate some form of solenoid-operated valve through which a desired rectilinear control of fluid (in response to an input control current) is effected. In addition to the requirement that fluid flow be substantially linearly proportional to applied current, it is also desired that hysteresis in the flow rate versus control current characteristic (which creates an undesirable dead band in the operation of the valve) be maintained within some minimum value.

For this purpose, one customary practice has been to physically support the solenoid's moveable armature within its surrounding drive coil by means of low friction bearings, such as Teflon rings. However, even with the use of such a material, the dead band is still not insignificant (e.g. on the order of 45 milliamps), which limits the degree of operational precision of the valve and thereby its application.

One proposal to deal with this physical contact-created hysteresis problem is to remove the armature support mechanism from within the excitation coil (where the unwanted friction of the armature support bearings would be encountered) to an end portion of the coil, and to mount the armature to a spring mechanism that is effectively supported outside of the coil. An example of such a valve configuration is found in the Everett U.S. Pat. No. 4,463,332, issued Jul. 31, 1984. In accordance with the patented design, the valve is attached to one end of an armature assembly supported for axial movement within a cylindrical housing that contains an electromagnetic coil and a permanent ring magnet surrounding the coil. One end of the solenoid contains a ring and spring armature assembly, which is located substantially outside the (high flux density) bore of the excitation coil and the position of which can be changed to adjust the flux gap in the magnetic circuit and thereby the force applied to the valve. Disadvantageously, however, this shifting of the moveable armature to a location substantially outside of the high flux density of the excitation coil, so as to reduce the friction-based hysteresis problem, creates the need for a magnetic flux booster component, supplied in the patented design in the form of a permanent magnet. Thus, although the intended functionality of such a structure is to adjust magnetic permeance and maintain linearity in the operation of the valve to which the armature is attached, the designs of both the overall solenoid structure and individual parts of which the solenoid is configured, particularly the ring spring armature assembly (which itself is a complicated brazed part) and the use of a permanent magnet, are complex and not easily manufacturable using low cost machining and assembly techniques, thereby resulting in a high pricetag per unit.

SUMMARY OF THE INVENTION

In accordance with the present invention, the design and manufacturing shortcomings of conventional proportional solenoid mechanisms, such as those described above, are overcome by a new and improved rectilinear motion proportional solenoid assembly, in which the moveable armature is supported well within the surrounding excitation coil, so as to be intimately coupled with its generated electromagnetic field (and thereby obviate the need for a permanent magnet), without the conventional use of hysteresis-creating bearings, and in which the force imparted to the movable armature is substantially constant irrespective of the magnitude of an axial air gap (over a prescribed range) between the armature and an adjacent magnetic pole piece.

For this purpose, the inventive solenoid assembly comprises a generally cylindrically configured housing containing an electromagnetic coil having a longitudinal coaxial bore. That portion of the housing surrounding the coil contains magnetic material for providing a flux path for the magnetic field produced by the coil. A generally cylindrical magnetic pole piece element is inserted into the bore and a movable (cylindrical) armature assembly of magnetic material is supported within the bore for movement within and in the direction of the axis of the electromagnetic coil. A first, radial gap, transverse to the bore axis, is formed between a first circumferential, cylindrical portion of the armature assembly and an interior cylindrical wall portion of the housing. A second, axial gap is formed between one end of the armature assembly and the adjacent pole piece element.

Linear proportionality between armature displacement and applied coil current is effected by means of an auxiliary cylindrical pole piece region, located adjacent to the axial gap. The auxiliary cylindrical pole piece region is tapered so as to have a varying thickness in the axial direction, and serves to effectively 'shunt' a portion of the magnetic flux that normally passes across the axial gap between the armature assembly and the pole piece element to a path of low reluctance, which results in a 'linearizing' or 'flattening' of the force vs. air gap characteristic over a prescribed range of axial air gap (corresponding to the intended operational range of displacement of the armature assembly).

Support for the armature assembly within the coil bore is provided by a pair of thin, highly flexible annular cantilever-configured suspension spring members, respectively coupled to axially spaced apart portions of the movable armature assembly and retained within the bore portion of the housing. An individual suspension spring member comprises an outer ring portion, a plurality of annular ring portions spaced apart from the outer ring portion and attached to the outer ring portion in cantilever fashion. An interior (spoke-configured) portion is attached to the annular ring portions. The interior portion is attached to the armature assembly, while the outer ring portion is fixedly secured at a cylindrical wall portion of the bore of the housing.

The housing includes a base member having a first generally cylindrically configured cavity in which the armature assembly is supported for axial movement, the cavity having a first cylindrical sidewall portion containing magnetic material, corresponding to the first portion of the housing, spaced apart from a first cylindrical portion of the armature assembly, so as to define therebetween the radial gap. A generally cylindrical member of non-magnetic material extends from the first cylindrical sidewall of the first cavity toward and coupled with the pole piece element. Located within the magnetic pole piece element is an adjustable spring bias assembly for imparting a controllable axial force to the armature assembly. The spring bias assembly includes a compression spring member and an adjustment screw, through which the compression spring is compressed and thereby couples a controllable axial force to the armature assembly.

The solenoid mechanism may be used to control fluid flow by coupling the armature to a fluid valve assembly, such as one containing a chamber that is in fluid communication with an inlet port and an outlet port. A valve poppet may be attached to the armature assembly for controllably opening and closing off one end of a tube member that extends from the chamber to the outlet port in accordance with axial movement of the armature assembly by the application of electric current to the solenoid coil.

DETAILED DESCRIPTION

Figure 1:
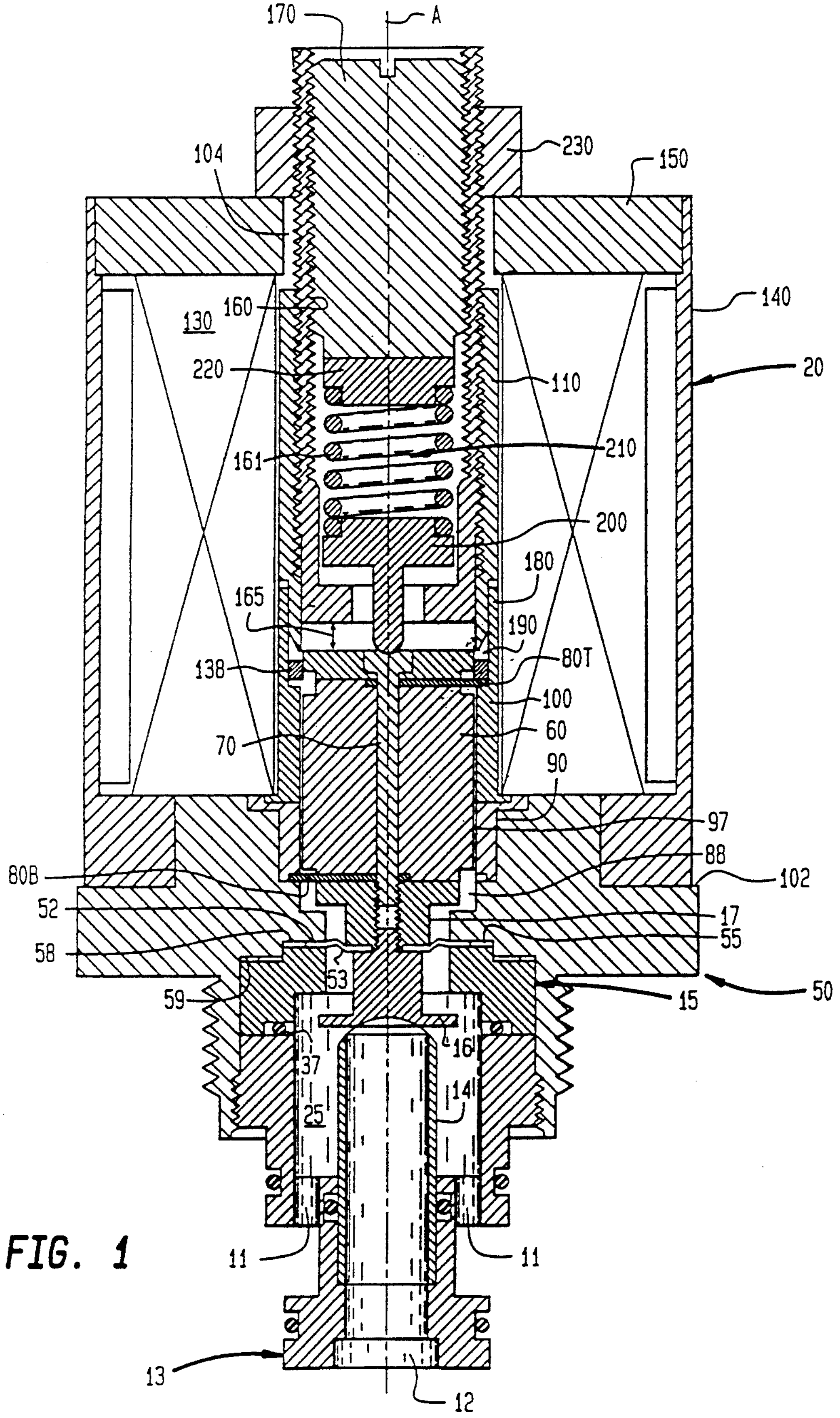
FIG. 1 is a longitudinal, cross-sectional illustration of an assembled proportional electro-pneumatic solenoid valve mechanism embodying the present invention.

Referring now to the drawings, FIG. 1 is a longitudinal, cross-sectional illustration of an assembled proportional electro-pneumatic solenoid valve mechanism embodying the present invention, while FIGS. 2-21 are cross-sectional views of its individual components. (In the description to follow, in order to avoid unnecessary cluttering, FIG. 1, per se, is not labelled with all of the reference numerals that are employed in FIGS. 2-21, wherein the individual components of FIG. 1 are labelled in detail.) In accordance with a preferred embodiment, the mechanism is of cylindrical configuration and, unless otherwise indicated, the cross-sectional illustrations of the Figures are assumed to taken along a plane containing a cylindrical axis of symmetry A.

Figure 2:
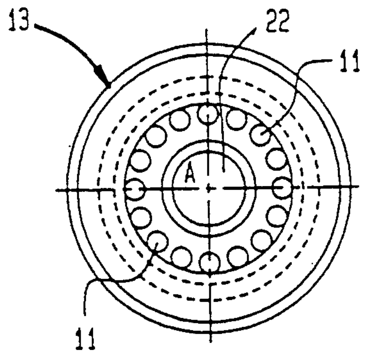
FIGS. 2 and 3 are respective bottom-end and cross-sectional side views of a valve seat.
Figure 3:
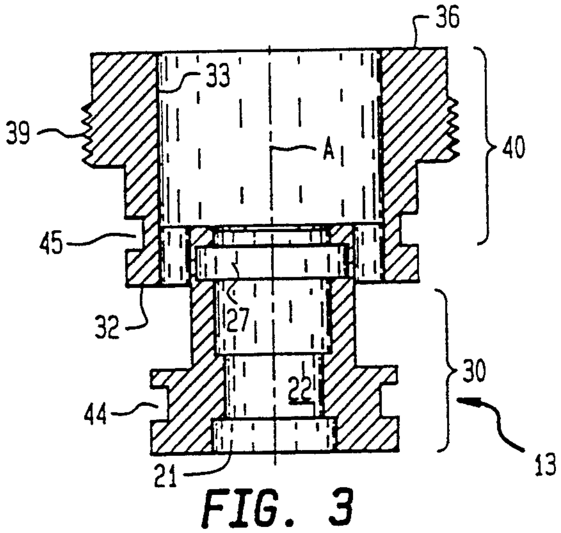
Figure 4:
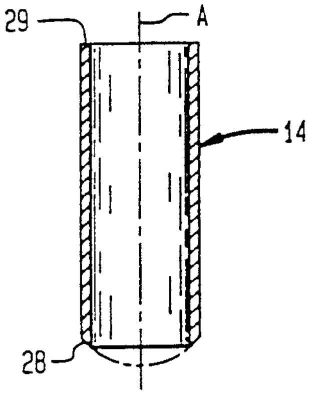
FIG. 4 is a cross-sectional illustration of a tubular insert.

As illustrated in FIG. 1, the proportional solenoid-controlled valve mechanism includes a valve unit of non-magnetic material, such as stainless steel, shown generally at 10, and a solenoid unit, comprised principally of magnetic material such as magnetic steel, shown generally at 20, which is mechanically linked to valve solenoid unit 10 for electrically controlling its operation and, thereby, the flow of a fluid between one or more valve entry ports 11 and a valve exit port 12. Valve unit 10 includes a valve seat 13 (respective individual bottom-end and cross-sectional side views of which are shown in FIGS. 2 and 3), a lower cylindrical portion 30 of which contains a plurality of entry ports 11 distributed in a circular fashion about an axis A, and a cylindrical exit port 12 coaxial with axis A. Exit port 1 is defined by the mouth portion 21 of a stepped cylindrical bore 22, which extends to an interior chamber 25 and is sized to snugly receive a tubular insert 14, such that the interior cylindrical wall of bore 22 is substantially coextensive with the interior cylindrical wall of tubular insert 14. A fluid seal between insert 14 and bore 22 is provided by way of an O-ring 26, which is captured within an annular depression 27 in bore 22. Preferably, as shown in FIG. 4, the inserted end portion 2 of tubular insert 14 is tapered to facilitate its entry into bore 22. The opposite end 29 of insert 14 has a substantially planar or flat surface, so that when firmly engaged by the lower substantially planar face 31 of a poppet 16 (shown individually in FIG. 5) the upper end of tubular insert 14 is effectively closed off or sealed thereby.

In addition to providing a seal between the outer cylindrical surface of tubular insert 14 and bore 22, O-ring permits a slight amount of adjustment of the position of the insert, specifically alignment of its end face 29, with the lower face 31 of poppet 16. After tubular insert 14 has been inserted into the lower cylindrical portion 30 of the valve seat 13, solenoid unit 20 is operated to cause an armature 60 and thereby poppet 16 to be urged into intimate contact with end face 29 of tubular insert 14 so as to effectively close off interior chamber 25 from exit port 12. Any minor initial misalignment between end face 29 of insert 14 and face 31 of poppet 16 will be automatically corrected by this action, so that insert 14 will thereafter be properly aligned with poppet 16 and complete closure of the end face 29 by bottom surface 31 of the poppet 16 is assured whenever armature as axially displaced to bring the poppet 16 into contact with the tubular insert 14.

The circularly distributed plurality of fluid entry holes 11 extend from a lower face 32 of upper cylindrical portion 40 to interior chamber 25 through which fluid, the flow of which is controlled by the solenoid-operated valve, passes during its tratel between entry ports 11 and exit port 12. Interior chamber 25 is of generally cylindrical configuration and is defined by a generally interior cylindrical sidewall 33 of upper cylindrical portion 40 of the valve seat and an interior cylindrical wall 34 of a valve seat spacer 15 (shown individually in FIG. 6) as substantially planar lower end face 35 of spacer 15 abuts against and is contiguous with a substantially planar upper end face 36 of valve seat 13. To ensure a fluid seal between spacer 15 and valve seat 13, an O-ring 37 is provided in an annular recess 38 in the lower end face 35 of spacer 15.

Upper cylindrical portion 40 of valve seat 13 further includes an outer cylindrical sidewall threaded portion 39, the diameter of which is sized to threadingly engage a threaded portion 41 of a cylindrical bore 42 of a base 50 of solenoid unit 20 (shown in FIG. 7), which is made of magnetic material such as magnetic steel and is sized to snugly receive valve seat 13, (as shown in FIG. 1). The lower cylindrical portion of base 50 contains an externally threaded ring portion 43 by way of which the valve mechanism may be threaded into a similarly threaded cylindrical wall receiving portion of a fluid transmission unit, such as an oxygen flow system (not shown), the flow through which is to be controlled. Typically, such a fluid transmission structure contains a stepped interior cylindrical bore, respective spaced apart circular and annular portions of which provide fluid communication ports the flow through which is to be controlled. To ensure sealing engagement with the cylindrical passageway of the fluid transmission unit, lower and upper portions 30 and 40 of valve seat 13 may be provided with annular recesses 44 and 45, respectively, into which O-rings (not shown) are captured.

Figure 5:
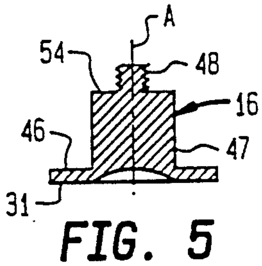
FIG. 5 is a cross-sectional illustration of the configuration of a poppet.
Figure 8:
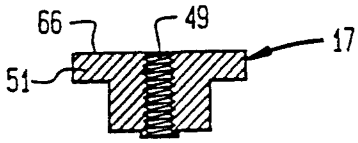
FIG. 8 is a cross-sectional illustration of a T-shaped poppet holder 17.
Figure 6:
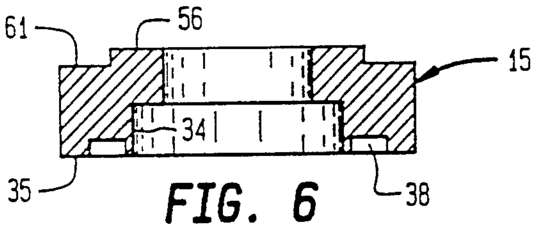
FIG. 6 is a cross-sectional illustration of the configuration of a valve seat spacer.
Figure 7:
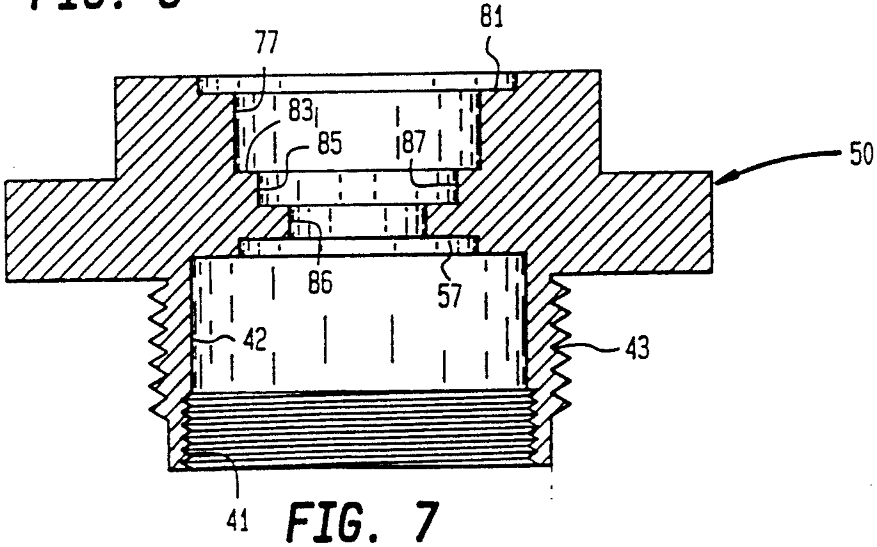
FIG. 7 is a cross-sectional illustration of the configuration of a solenoid base.
Figure 9:
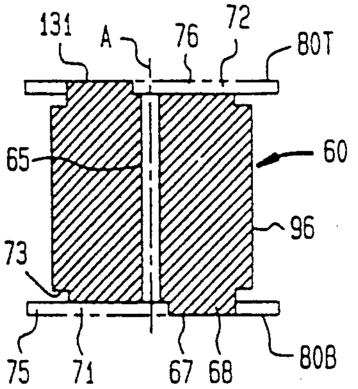
FIGS. 9 and 10 are respective cross-sectional and perspective views of an armature.

As pointed out above, the flow of fluid from inlet ports 11 through chamber 25 and insert 14 to exit port 12 is cut off when the lower face 31 of poppet 16 is urged against end face 29 of tubular insert 14. As shown in FIG. 5, poppet 16 is of generally solid T-shaped cross-section having a disc-like T-portion 46 and a cylindrical base portion 47 solid therewith. Extending from an end face 31 of base portion 47 is an externally threaded nub 48 which threadingly engages an interior threaded cylindrical axial bore 49 of a generally solid T-shaped poppet holder 17 (shown individually in FIG. 8), a lower face portion 51 of which abuts against the top surface 52 of a diaphragm 18, which provides a flexible seal between interior chamber 25 of valve unit 10 and (the moveable armature of) solenoid unit 20. The bottom surface 53 of diaphragm 18 is arranged to abut against end surface 54 of poppet 16 as the nub of the poppet is threaded into axial bore 49 of poppet holder 17, so that a central region of diaphragm 18 may be captured or sandwiched between poppet holder 17 and poppet 16.

Diaphragm 18 has an outer annular portion 55 that is captured between a top surface 56 of spacer 15 and a recessed surface portion 57 of bore 42 of base 50. A pair of rings 58 and 59 are seated atop surface 56 (adjacent diaphragm 18) and surface 61, respectively, of spacer 15, providing secure sealing engagement between valve unit 10 and solenoid unit 20 and thereby prevent fluid communication between the solenoid unit 20 and the interior chamber 25 of valve unit 10, so that the possible intrusion of foreign matter (e.g. minute metal filings) from the interior of the solenoid unit 20 into the fluid which is controllably metered by valve unit 10 cannot occur.

Within solenoid unit 20, poppet holder 17 of valve unit 10 is fixedly engaged with a generally solid cylindrical magnetic steel armature 60 (shown in cross-section in FIG. 9 and isometrically in FIG. 10) by means of a position screw 70 (shown in FIG. 11) of magnetic material having a head 62, a shaft 63 and a threaded end portion 64. Position screw 70 is sized to permit shaft 63 to pass through an interior cylindrical bore 65 of armature 60 and, by means of threaded end portion 64, is threadingly engaged within the interior threaded bore 49 of poppet holder 17, so that an upper face 66 of poppet holder 17 is drawn against a lower face 67 of bottom cylindrical land region 68 of armature 100.

Figure 10:
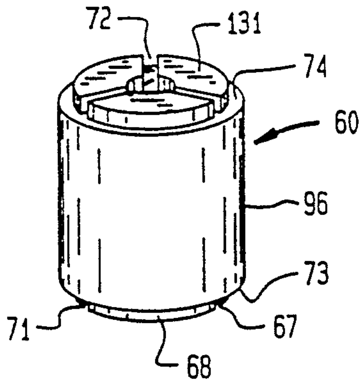
Figure 11:
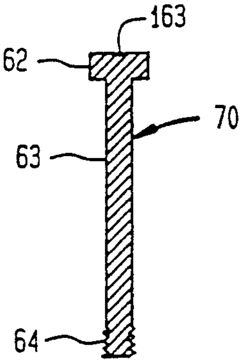
FIG. 11 is a cross-sectional illustration of a position screw.
Figure 13:
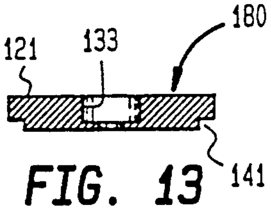
FIG. 13 is a cross-sectional illustration of a disk-shaped armature cap.
Figure 15:
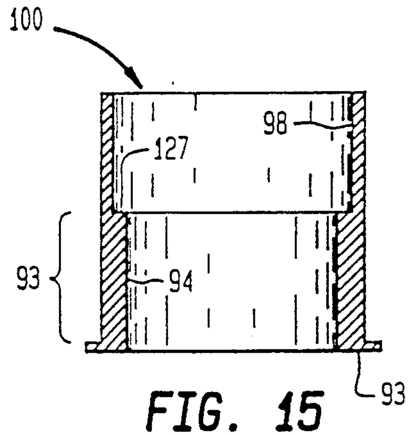
FIG. 15 is a cross-sectional illustration of a non-magnetic insert.

As shown in FIGS. 10 and 11, bottom cylindrical land region 68 and a like top cylindrical land region 69 of armature 60 are provided with respective arrangements 71 and 72 of slots which extend radially from bore 65 to annular surface regions 73 and 74, respectively. Slots 71 and 72 are sized to snugly receive radially extending spoke portions 75 and 76 (shown in broken lines in FIG. 10) of a pair of thin, flexible and non-magnetic (e.g. beryllium-copper) suspension springs 80B and 80T (an individual one of which is shown in detail in FIG. 21 to be described below). Spoke portions 75 of lower spring 80B are captured between slots 71 of armature 60 and face 66 of poppet holder 18, while spoke portions 76 of upper spring 80T are captured between slots 72 and a magnetic armature cap 180 (shown in FIG. 13, to be described below).

Armature 60 is supported by suspension springs 80B and 80T within the interior portion of the solenoid unit 20 and is arranged for axial displacement (along axis A) in response to the controlled generation of magnetic field. As armature 60 is axially displaced, poppet holder 17, which is effectively solid with the face 67 of bottom land portion 68 of armature 60, and poppet 16, which is threaded into the poppet holder 17, are also axially displaced. The axial displacement of poppet 16 controls the separation between face 31 of poppet 16 and thereby the degree of opening of tubular insert 14 to chamber 25 of valve unit 10. Consequently, axial displacement of armature 60 controls the flow of fluid under pressure between input ports 11 and exit port 12.

Figure 14:
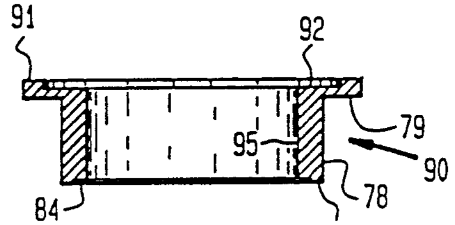
FIG. 14 is a cross-sectional illustration of a magnetic insert.
Figure 16:
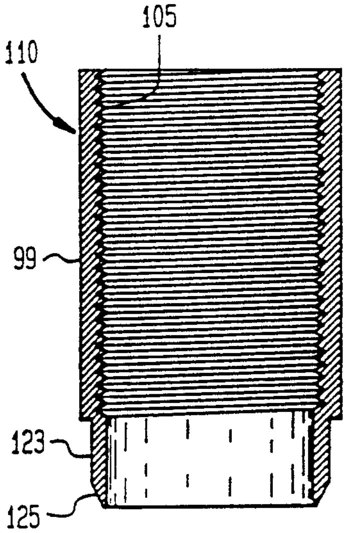
FIG. 16 is a cross-sectional illustration of a cylindrical sleeve.
Figure 17:
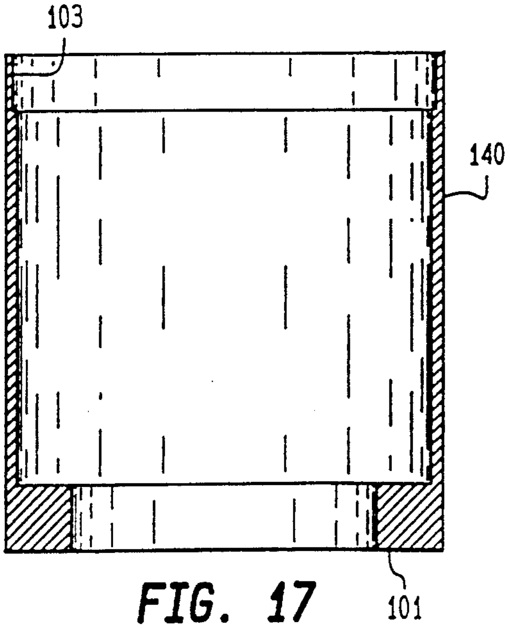
FIG. 17 is a cross-sectional illustration of a cylindrical coil cover.
Figure 18:
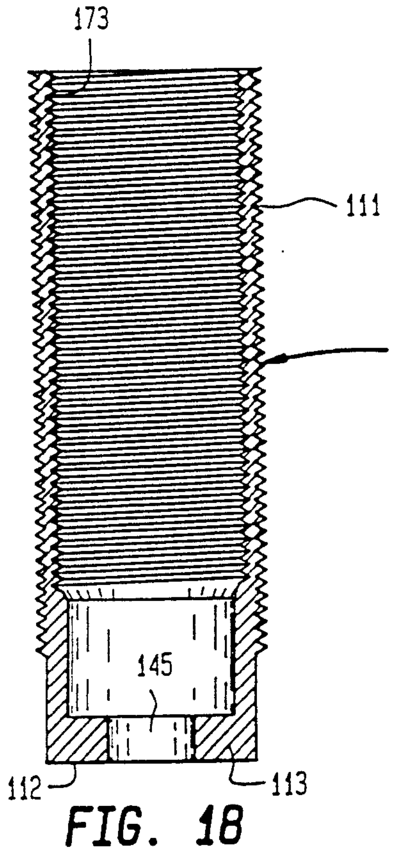
FIG. 18 is a cross-sectional illustration of a cross-sectional illustration of a cylindrical pole piece.
Figure 19:
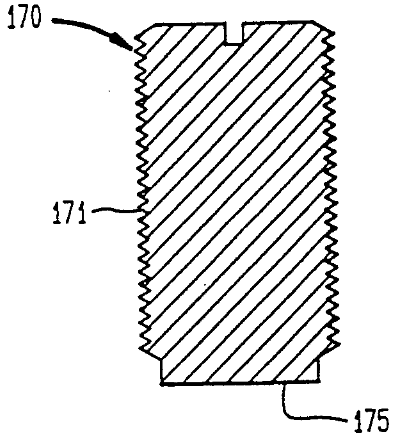
FIG. 19 is a cross-sectional illustration of a solid magnetic adjustment screw.
Figure 20:
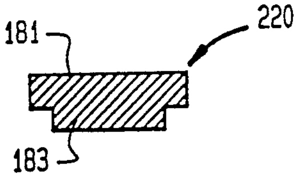
FIG. 20 is a cross-sectional illustration of an upper spring retainer.

To support armature 60 for axial movement, base 50 includes a stepped top bore portion 77 that is sized to receive a magnetic insert 90 (shown in FIG. 14). Insert 90 has a generally inverted L-shape, an outer stepped cylindrical wall portion 78 of which engages stepped cylindrical bore portion 77 of base 50, such that an outer annular face region 79 of magnetic insert 90 rests atop an annular land portion 81 of base 50. A bottom surface portion 82 of insert 90 is supported by and abuts against a recessed face portion 83 of the stepped cylindrical bore portion 77 of base 50. An interior annular recess portion 84 of insert 90 adjacent to bottom surface portion 82 is sized to receive a circumferential annular region of suspension spring 80B, so that spring 80B may be captured between recessed face portion 83 of base 50 and magnetic insert 90.

The stepped top bore portion of base 50 further includes stepped interior cylindrical sidewalls 85 and 86, the diameters of which are larger than the diameter of poppet holder 17 and an annular surface region 87 which joins sidewalls 85 and 86, so as to provide a hollow cylindrical region 88 that permits unobstructed axial displacement of poppet holder 17 during movement of armature 60.

The top portion 91 of insert 90 has an annular recess 92 which is sized to receive a flared portion 93 of a cylindrical sleeve or tube 100 (shown in FIG. 15) made of non-magnetic material, such as brass or stainless steel. Tube 100 has a first interior cylindrical sidewall portion 94 the diameter of which is substantially continuous with the diameter of interior cylindrical sidewall portion 95 of insert 90 so as to provide an effectively continuous cylindrical passageway or bore through which solid cylindrical armature 60 may be inserted for axial displacement within the interior of the solenoid unit 20. A slight separation (on the order of 10 mils) between the cylindrical sidewall 96 of armature 60 and the interior cylindrical sidewall 95 of magnetic insert 140 provides an air gap 97 which extends in a direction effectively transverse to axis A, namely in the radial direction of solenoid unit 20. Because tube 100 is comprised of non-magnetic material, the flux of the magnetic field through the base 50 and magnetic insert 90 will see a lower reluctance path across air gap 96 and armature 100, rather than into the nonmagnetic material of tube 100.

The upper interior sidewall portion 98 of non-magnetic tube 100 is engaged by a generally cylindrical sleeve 110 of magnetic material (shown in FIG. 16), an exterior cylindrical sidewall portion 99 of which is effective diametrically the same as that of tube 100, so as to provide a cylindrical support 120 around which an energizing winding or coil 130 may be formed. Coil 130 is surrounded by a cylindrical cover 140 of magnetic material (shown in FIG. 17), a lower portion 101 of which is supported by an annular land region 102 of base 50, and an upper recessed annular portion 103 of which is sized to receive a generally disk-shaped coil cover cap 150 of magnetic material. Coil cover cap 150 has an axial cylindrical opening or passage 104 through which a cylindrical magnetic steel pole piece 160 (shown in FIG. 18) and a solid magnetic material (magnetic steel) adjustment screw 170 (shown in FIG. 19), threadingly engaged therewith, are inserted and threadingly engage interior threaded cylindrical wall 105 of magnetic sleeve 110. Specifically, the outer cylindrical wall 111 of hollow cylindrical pole piece 160 is threaded for engagement with interior threaded portion 105 of magnetic sleeve 110, so as to provide for adjustment of the relative axial displacement between pole piece 160 and magnetic sleeve 110. This adjustment, in turn, controls the axial air gap separation between the bottom face 112 of pole piece end region 113 with respect to the top face 121 of armature cap 180.

Magnetic sleeve 110 further includes a lower portion 123 which is tapered at end region portion 125 to form a "shunt" magnetic region which is immediately adjacent to face 121 of armature cap 180. Tapered end region 125 terminates at an annular sleeve or ring 190 of non-magnetic material (e.g. stainless steel) which is inserted into non-magnetic tube 100, so as to abut against an outer annular portion of the top surface of suspension spring 80T, the bottom surface of which rests against an interior annular lip portion 127 of tube 100.

Abutting against top surface 131 of land portion 69 of armature 60 is a generally disk-shaped armature cap 180 (shown in FIG. 13), which includes a central cylindrically stepped bore portion 133 for accommodating head 62 of position screw 70, such that when position screw is fully inserted into armature cap 180 and armature 60, with suspension spring 80T captured therebetween, the top of the screw head is flush with surface 131. Armature cap 180 and armature 60 have respective mutually opposing annular recesses 141 and 143 to provide an annular gap or displacement region 138 that permits flexing of spring 80T, as will be described below with reference to FIG. 21. This annular flexing region 138 is similar to region 88 within base 50 adjacent to poppet holder 17, whereat spring 80B is captured between insert 90 and surface region 83 of base 50. As described briefly above, through the use the pair of thin, flexible support springs 80B and 80T, armature 60 can be supported well within the surrounding excitation coil, without the need for conventional friction bearings, thereby substantially obviating both the hysteresis problem and the need for permanent magnet to boost the magnetic field excitation circuit, such as that employed in the previously-reference patented design, wherein the movable armature is supported substantially outside the high density flux region of the coil bore.

Figure 12:
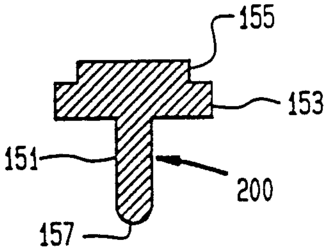
FIG. 12 is a cross-sectional illustration of a T-shaped spring retainer.

End region 113 of hollow cylindrical pole piece 160 has a cylindrical aperture 145 for passage of the central leg 151 of a T-shaped non-magnetic spring retainer 200 (shown in FIG. 12). The upper disc-shaped portion 153 of spring retainer 200 has a circular land portion 155 which is sized to fit within the interior cylindrical region 161 of a helical compression spring 210. The length of the central leg portion 151 of spring retainer 200 provides a separation 165 between region 113 of pole piece 160 and T-shaped portion 153 of spring retainer 200. Leg portion 151 has a curved bottom or end portion 157 to facilitate mechanical engagement with a depression 163 in the head 62 of position screw 70.

Solid adjustment screw 170 has an outer threaded cylindrical wall portion 171 which threadingly engages an interior cylindrical threaded portion 173 of pole piece 160. The lower face of 175 of adjustment screw 170 abuts against the upper face 181 of a generally disk-shaped upper spring retainer 220 (shown in FIG. 20), a reduced diameter lower circular land portion 183 of which is sized to fit within the hollow cylindrical interior of compression spring 210, so that upper spring retainer 220 may mechanically engage spring 210 and, together with lower spring retainer 200 effectively capture compression spring 210 therebetween.

Pole piece 160 and the associated mechanically linked components of the solenoid unit 20 are secured by means of a locknut 230 which engages the outer threaded cylindrical wall 111 of pole piece 160 and frictionally engages coil cover cap 150.

Figure 21:
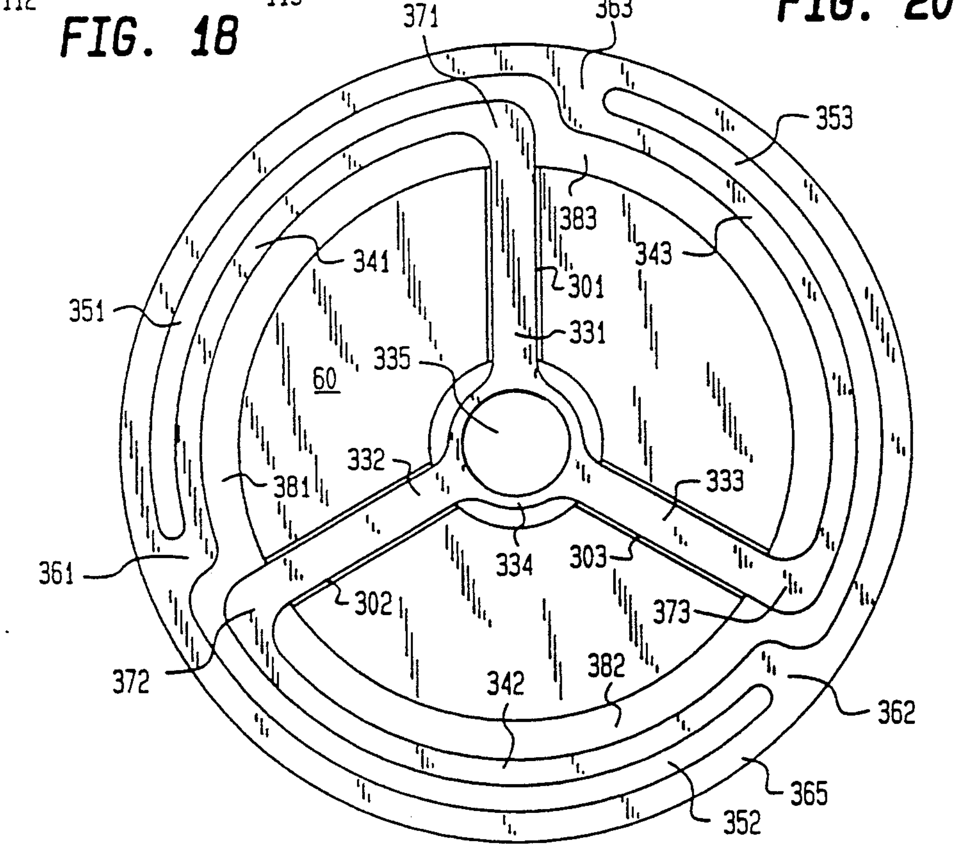
FIG. 21 shows a top view of the configuration of a suspension spring.

The manner in which each of springs 80T and 80B engages end surfaces of and supports armature 100 for axial movement within the solenoid unit 20 will be described with reference to FIG. 21 which shows a top or plan view of the configuration of an individual one of the springs 80T and 80B and the engagement of that spring with respective slots at end portions of the armature 60. As shown in FIG. 21, an individual spring is comprised of three spokes 301, 302 and 303 which extend from a central annular hub 304 having an interior aperture 335 which coincides with bore 65 of armature 60. Spokes 301, 302 and 303 are captured within and bonded to respective slots 331, 332 and 333 in an end land portion (68, 69) of the armature cylinder 60. From the outer portions of each of the spokes extend respective annular segments 341, 342 and 343. Annular segment 341 is connected by way of a tab 361 to an outer solid ring 365. Similarly, annular segment 342 is connected by way of tab 362 and annular segment 343 is connected by way of tab 363 to solid ring 365. A respective annular opening or flexing region 351, 352 and 353 separates each of arcuate segments 341, 342 and 343 from outer ring 365. Annular segment 341 is coupled to spoke 302 by way of a tab 371. Similarly, annular segment 342 is coupled to spoke 302 by way of tab 372, while annular segment 343 is coupled to spoke 303 by way of tab 373. The diameter of each of the end land portions 68, 69 of armature 60 has a diameter less than that of annular segments 341, 342 and 343, so that there are respective annular separation regions 381, 382 and 333 between armature 60 and annular segments 341, 342 and 343 of the support spring.

To illustrate the flexible support function provided by each of springs 80T and 80B, consider the application of a force upon armature 60 along axis A for displacing the armature into the drawing of FIG. 21 as indicated by the X in the center of the Figure. A force which displaces the armature into the Figure will cause respective tabs 371, 372 and 373 at the end of spokes 301, 302, and 303, respectively, to also be displaced in parallel with the axial displacement and into the page of the Figure. This force will cause a flexing of each of arcuate segments 341, 342 and 343 from cantilevered support tabs 361, 362 and 363 along arcuate or circumferential segments within the flexing region surrounding the cylindrical sidewalls of the armature 60. Because of the flexibility and circumferential cantilevered configuration of suspension spring members 80T and 80B, insertion of an flexible support for armature 60 within the cylindrical hollow interior of the solenoid unit 20, without the use of hysteresis-introducing bearings, is afforded, so that the armature may be intimately magnetically coupled with the magnetic field generated by coil 20. As noted earlier, this aspect of the present invention provides a significant advantage over the above-referenced patented configuration, in which a permanent magnet is required as part of the magnetic field generation circuit and the spring support mechanism employed cannot be inserted within the coil, but must be retained effectively outside of and at an end portion of the coil, requiring the use of a disk-shaped armature member, the magnetic interaction of which with the magnetic flux of the solenoid is substantially reduced, (necessitating the use of a permanent magnet).

Assembly of the individual components of the solenoid unit preferably proceeds in the sequence diagrammatically illustrated below with reference to FIGS. 22–28.

Figure 22:
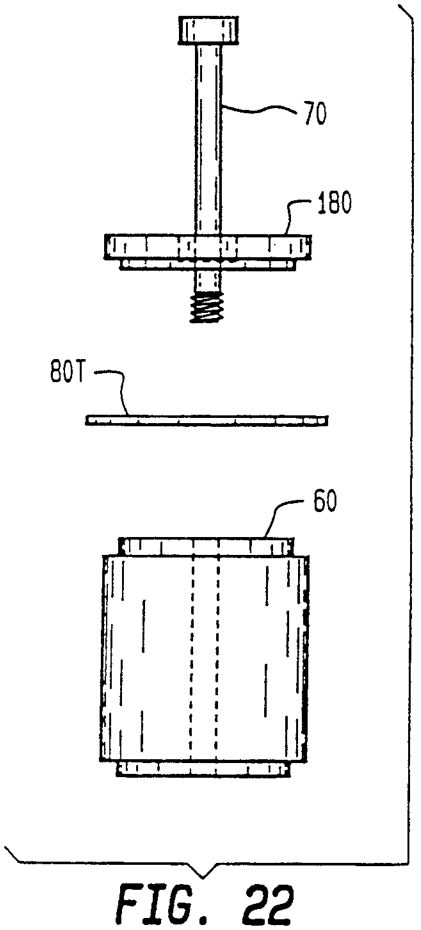
FIGS. 22-28 diagrammatically depict the sequence of the assembly of the individual components of the solenoid unit of FIG. 1.
Figure 24:
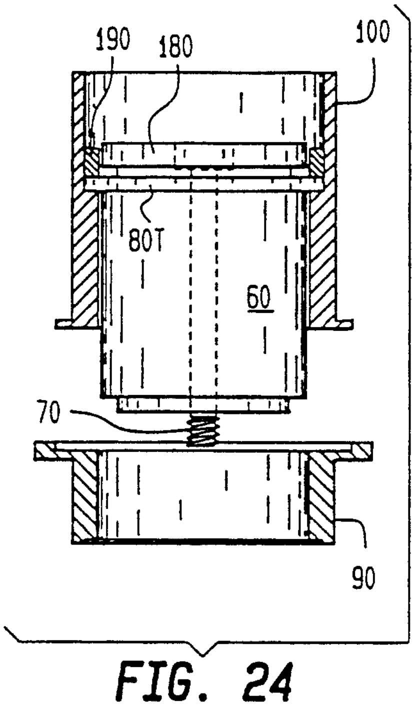

As shown in FIG. 22, the support components for the armature 60 are initially assembled by braze-bonding the three spoke arms of each of respective suspension springs 80T and 80B within the slots in the bottom and top land portions of the armature 60. With each of suspension 80T and 80B bonded to the slots at opposite ends of the armature 60, the top surface of spring 80T will be flush with the top surface 131 of the armature while the bottom surface of spring 80B will be flush with the bottom surface 67 of the armature. Next, armature cap 180 is placed on the top surface of armature 60 and screw 70 is inserted through the central aperture 133 in the armature cap and through bore 65 in armature 60, such that the top surface of the head 62 of screw 70 is flush with the top surface 121 of armature cap 180. In this flush configuration, the threaded end portion 64 of position screw 70 will protrude beyond the bottom surface 67 of armature 60. Preferably the head 62 of positioning screw 70 is now brazed in place in its flush-mounted position with armature cap 180.

Figure 23:
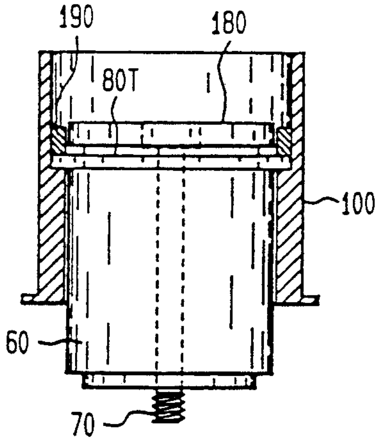

Next, as shown in FIG. 23, the assembled components of FIG. 22 are inserted into non-magnetic tube 100, such that outer annular ring portion 365 of spring 80T is flush with interior annular lip portion 127 of tube 100. Next, stainless steel ring 190 is inserted into tube 100 to be snugly captured within interior cylindrical sidewall 90 and atop outer annular ring portion 365 of spring 80T. Outer annular portion 365 of spring 80T and ring 190 are then bonded to tube 100. In this mounting configuration, armature 60 is now suspended within tube 100 by spring 80T, which provides for the above-referenced segmented circumferential cantilevered flexing via arcuate segments 341, 342 and 343, as shown in FIG. 21. The assembly shown in FIG. 23 is then inserted into the recessed portion 92 of magnetic steel insert 90 and tube 100 and insert 90 are brazed bonded.

Figure 25:
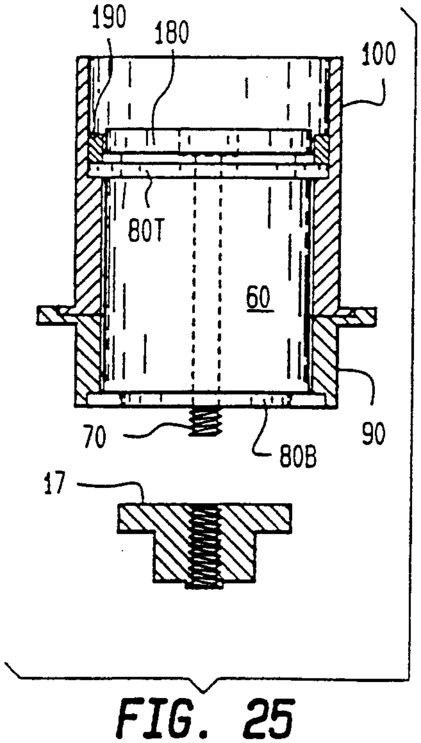

Next, as shown in FIG. 25, lower suspension spring 80B is coupled with armature 60 such that the spokes of the spring are captured by slots 71, the spokes being bonded in the slots and outer annular ring portion 365 of the spring being bonded in recess 84 of insert 90. In this configuration, armature 60 is now suspended at its opposite ends by springs 80T and 80B and can flex axially by virtue of the cantilevered annular segments 341, 342 and 343 of each spring, as described above with reference to FIG. 21. Poppet holder 17 is now threaded onto position screw 70 and bonded to the bottom face of armature 60.

Figure 26:
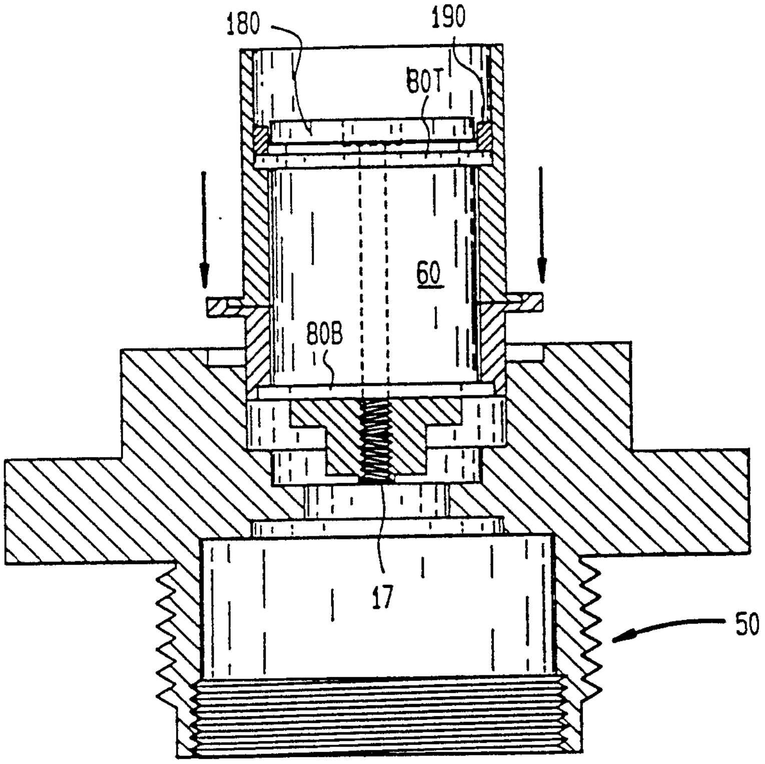

Next, as shown in FIG. 26, the assembled components of FIG. 25 are inserted into the interior stepped cylindrical bore of base 50, such that outer annular face 79 of insert 90 rests against the top step 81 of base 50, whereat the two units are bonded together. Additional bonding may be effected at the bottom surface 82 of insert 90 and the stepped portion of the bore of base 50.

Figure 27:
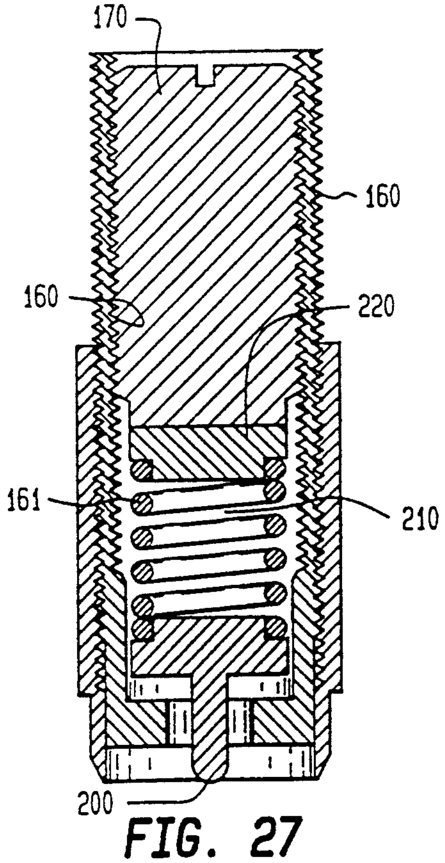

With the armature now attached to base 50, the pole piece components are assembled in the manner shown in FIG. 27. Specifically, lower spring retainer 200 is inserted through aperture 145 in pole piece 160, compression spring 210 is dropped into place upon the upper surface of lower spring retainer 200, while upper spring retainer 220 is inserted into the top of the spring. Pole piece 160 is then threaded into the interior threaded bore of magnetic sleeve 110 until pole piece region 113 is a prescribed (displacement-calibration) distance from the tapered portion 125 of shunt region 123 of sleeve 110.

Next, pole piece 160 is inserted into non-magnetic tube 100 such that the terminating end of tapered portion 125 contacts ring 190. The length of the tapered end portion 125 of magnetic sleeve 100 is slightly longer than the distance between the top of ring 190 and the top of tube 100 to ensure that, when inserted into tube 100, magnetic sleeve 110 will always have tapered region 125 terminate at ring 190 and thereby be immediately adjacent armature cap 180. Sleeve 110 is preferably braze-bonded to tube 100 to secure the two cylindrical pieces together and provide a support cylinder for the mounting of electromagnetic coil 130.

Figure 28:
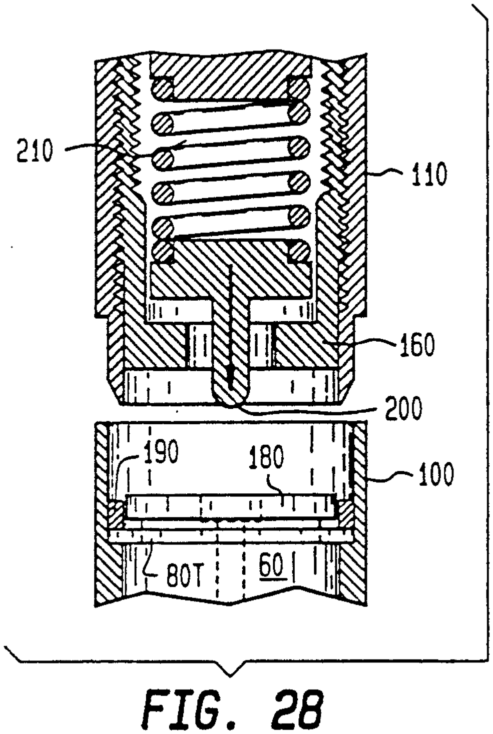

Coil 130 is then placed around the interior tubular unit comprised of magnetic sleeve 110 and stainless steel tube 100, and coil cover 140 and coil cover cap 150 are attached (bonded) to base 50. Adjustment screw 170 is now threaded into the interior bore portion of pole piece 160 until it contacts upper spring holder 220. In this configuration, as shown in FIG. 28, all of the components of the solenoid unit are aligned with axis A and lower spring retainer 200 is urged against the top indented portion of positioning screw 70. Locknut 230 is threaded onto the outer cylindrical portion of pole piece 160 to secure the unit together. By rotating adjustment screw 170 (clockwise or counter-clockwise) within the threaded bore of pole piece 160, a prescribed spring bias can be urged against armature 60.

Figure 29:
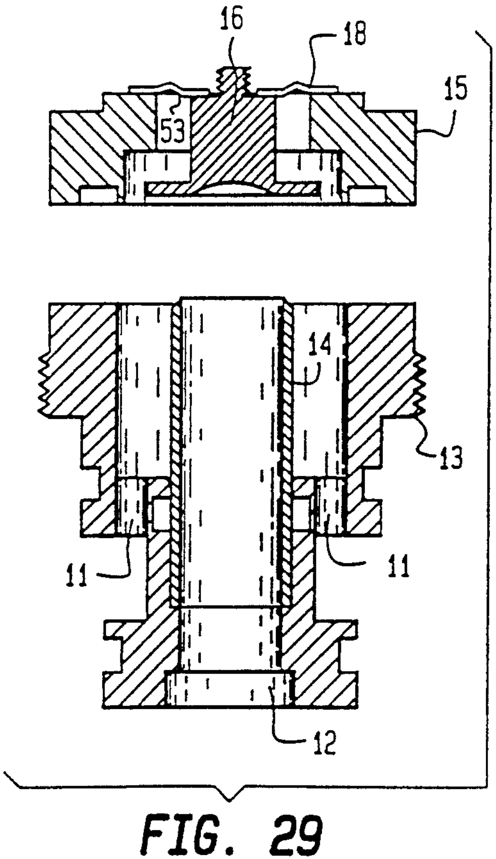

Valve unit 10 is assembled in the manner shown in FIG. 29. Specifically, with-ring 26 in place, tubular insert 14 is inserted through the interior chamber 25 of upper cylindrical portion 40 of valve seat 13 and into bore 22 of lower cylindrical portion 30 until it snugly fits and is retained therein. Diaphragm 18 is affixed to poppet holder 17 and base 50 and is captured at its inner portion by poppet 16, which is threaded into the interior bore 49 of poppet holder 17. Spacer 15 is next braze bonded into place within base 50. With O-ring 37 in place, the upper cylindrical portion 40 of valve seat 13 is threaded into the interior threaded walls of base 50 such that spacer 15 and upper cylindrical portion 40 of the valve seat 13 are flush against one another and sealed. Assembly of the unit is now complete.

As pointed out above, one of the characteristics of the configuration of the solenoid assembly of the present invention is the very precise linearity of operation (armature displacement/force versus applied coil excitation) that is achieved by the configuration of the armature/pole piece assembly. This characteristic is contrasted with those shown in FIGS. 30 and 31, which respectively show relationships of applied armature force versus axial air gap and armature displacement versus applied coil current of non-tapered/shunt designs.

In any solenoid, there are two air gaps through which the magnetic flux must pass. One of these air gaps, the radial air gap, is fixed regardless of the axial position of the armature. In the configuration described in the above-referenced Everett patent '332, the radial air gap is formed at an end portion of the solenoid by way of a slot or gap outside of the vicinity of the excitation winding. In the present invention, radial air gap 97 is defined between the cylindrical sidewall 96 of armature 60 and the interior cylindrical sidewall 95 of magnetic insert 90. Regardless of the position of the armature 60 as it is displaced along axis A, the radial air gap dimension does not change.

In the above-referenced Everett configuration, the controlling air gap is between an end T-shaped disk-like armature which is supported by a pair of springs outside the solenoid, and an interior armature which passes through the central cylindrical bore of the solenoid. Because of the geometry and magnetic field relationships within the solenoid, the force vs. air gap relationship and displacement of the armature for changes in current typically follow the nonlinear characteristics shown in FIGS. 30 and 31. In the solenoid structure described in the above-referenced Everett patent, compensation for the nonlinearity is effectively achieved by a complementary acting spring mechanism located outside an end portion of the solenoid. As a result of the particular configuration of the disk-shaped armature and its supporting spring mechanism, the Everett solenoid is able to achieve a satisfactory linear operation. However, to accomplish this, the Everett solenoid requires the use of a permanent magnet as an assist to the coil-generated magnetic field, the armature being mounted at a remote end of the solenoid and, for the most part, being substantially spaced apart from that region of the magnetic field generated by the solenoid having the highest flux density (the interior of the coil winding).

Figure 30:
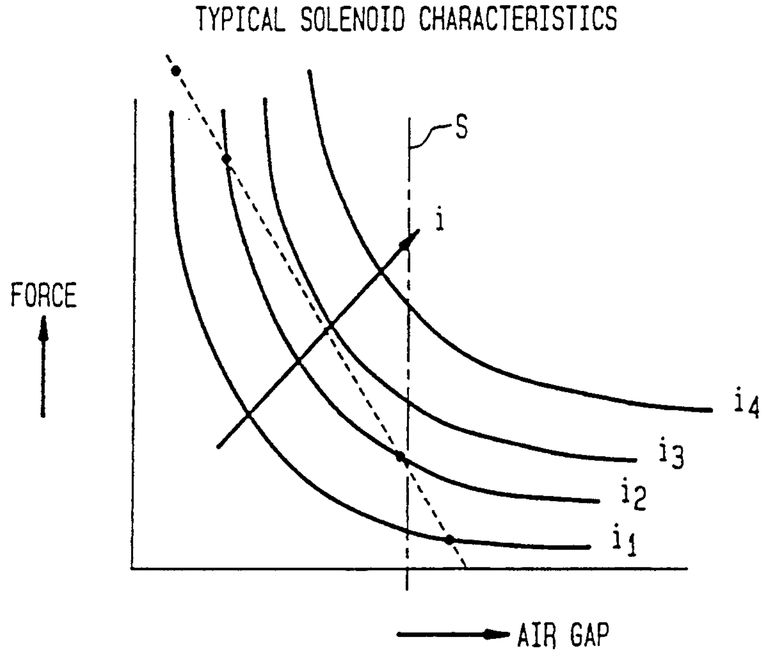
FIGS. 30 and 31 respectively show prior art relationships of applied armature force versus axial air gap and armature displacement versus applied coil current.
Figure 31:
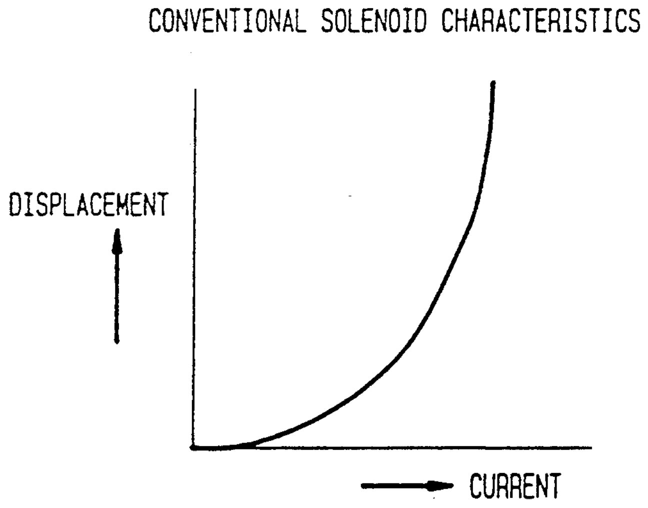
Figure 32:
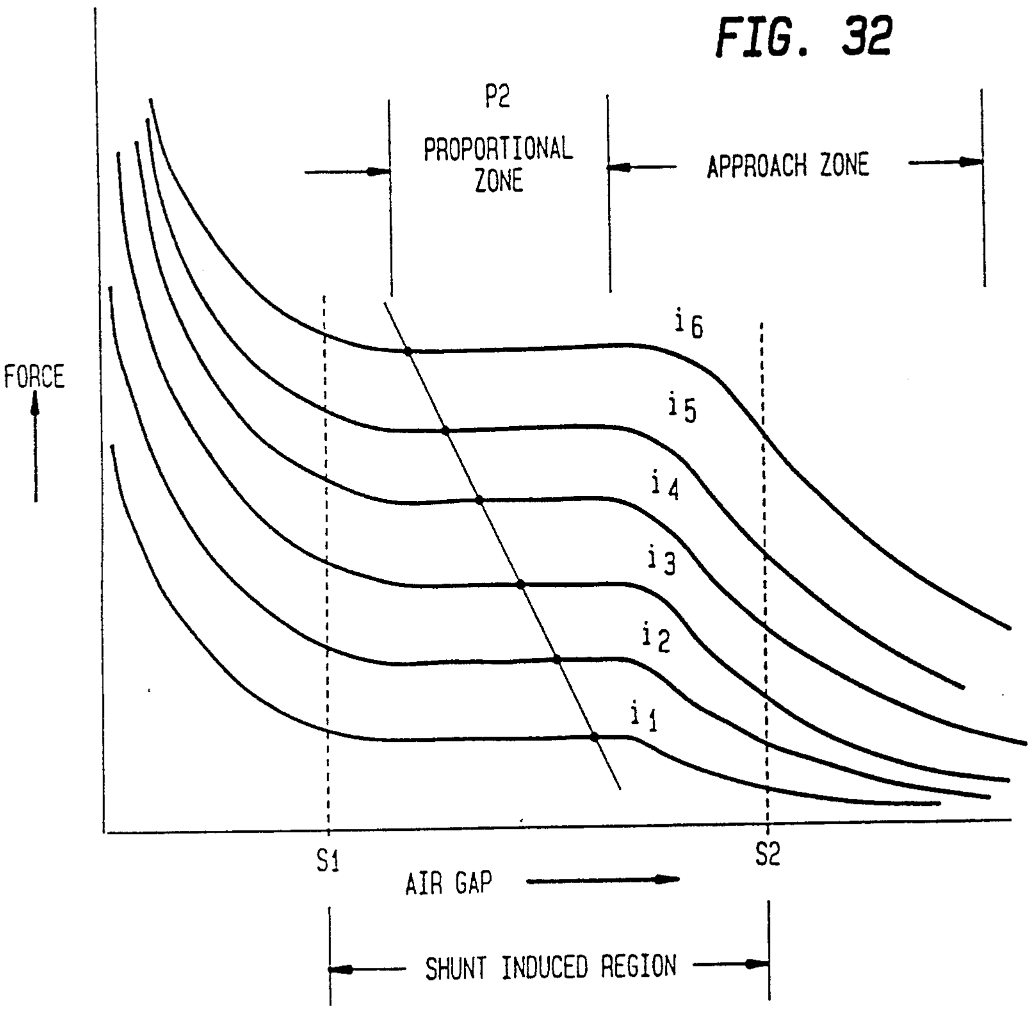
FIG. 32 shows a force vs. air gap characteristic obtained by the proportional solenoid assembly of the present invention containing a proportional zone over which the force versus air gap characteristic is substantially flat.
Figure 33:
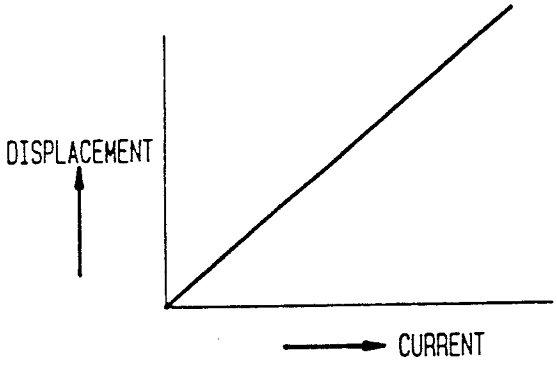
FIG. 33 is a characteristic showing the linearity between armature displacement and applied current produced by the solenoid assembly of the present invention.

In accordance with the present invention, on the other hand, by means of the thin, flexible, cantilevered suspension spring configuration, it is possible to support the armature substantially within the core portion of the coil winding, where the generated flux density is highest, thereby removing the need of a permanent magnet. Moreover, by configuring the pole piece to contain the tapered shunt portion 123 as an additional radial air gap coupling region adjacent to the axial air gap 97, the conventional nonlinear force versus air gap characteristic shown in FIG. 30 is effectively modified to result in a relationship as shown in FIG. 32 containing a proportional zone PZ over which the force versus air gap characteristic is substantially flat. When the linear spring characteristic of compressional spring 210 is superimposed on the proportional zone PZ of the force versus air gap characteristic, (similar to an electrical circuit load line), then for incremental changes in current ($i_1 \ldots i_2 \ldots i_3 \ldots$) there is a corresponding change in force and displacement of the armature, so that displacement of the armature is linearly proportional to the applied current, as shown in the characteristic of FIG. 33.

Figure 34:
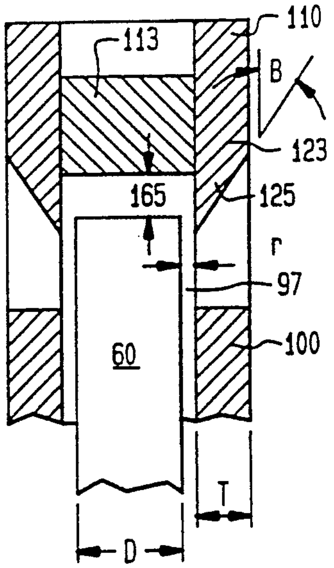
FIG. 34 diagrammatically illustrates the manner in which a tapered 'shunt' pole piece region causes a portion of axial air gap flux to be diverted radially across an auxiliary radial air gap-bridging flux path.

While the flattened characteristic within the proportional zone PZ where the force versus air gap characteristics of FIG. 32 is complicated to explain from purely mathematical terms, it has been found that the size of the proportional zone depends upon a number of factors, including the permeability of the magnetic material of the pole piece and the angle B of the tapered portion 123 adjacent to the axial air gap 165 between the armature assembly and the pole piece, as diagrammatically illustrated in FIG. 34. In effect, tapered portion 123 causes a portion of the flux that would normally be completely axially directed across axial air gap 165 to be diverted, or 'shunted', radially across an auxiliary radial air gap-bridging flux path between the armature and the pole piece. By virtue of its varying thickness (change in cross-section and taper of the shunt region 123) magnetic sleeve provides an adjustable bypass or flux shunt region which modifies the force versus air gap characteristic of FIG. 30 to include the flattened proportional zone characteristic shown in FIG. 32.

While it is complicated to derive analytically, in terms of a precise expression for the relationship shown in FIG. 32, what Applicant believes in effect happens is that the characteristic curve shown in FIG. 30 of the relationship between applied force and the axial air gap, is split at the location of the axial air gap whereat the shunt region is provided to form an auxiliary radial magnetic flux path. The splitting of the force versus air gap characteristic creates an intermediate proportional zone PZ that possesses a substantially flat region over a portion between segments S1 and S2 which, but for the shunt tapered region, when joined together would effectively recreate the characteristic shown in FIG. 30.

As will be appreciated from the foregoing description, both the hysteresis and hardware assembly and manufacturing complexities of conventional solenoid valve control mechanisms, such as those described above, are overcome by a new and improved rectilinear motion proportional solenoid assembly, in which the moveable armature is supported well within the surrounding excitation coil, so as to be intimately coupled with its generated electromagnetic field (and thereby obviate the need for a permanent magnet), without the use of hysteresis-creating bearings, and in which the force imparted to the movable armature is substantially constant irrespective of the magnitude of an axial air gap (over a prescribed range) between the armature and an adjacent magnetic pole piece. Moreover, by means of an auxiliary radial pole piece region adjacent to the axial air gap, the force imparted to the armature is substantially constant irrespective of the magnitude of an axial air gap (over a prescribed range) between the armature and an adjacent magnetic pole piece.

While I have shown and described an embodiment in accordance with the present invention, it is to be understood that the same is not limited thereto but is susceptible to numerous changes and modifications as known to a person skilled in the art, and I therefore do not wish to be limited to the details shown and described herein but intend to cover all such changes and modifications as are obvious to one of ordinary skill in the art.

What is claimed:

1. A rectilinear motion proportional solenoid device comprising:

a housing containing an electromagnetic coil, having a longitudinal axis and a bore coaxial therewith, for producing a magnetic field, said housing containing magnetic material for providing a flux path for said magnetic field;

a magnetic pole piece disposed within the bore of said electromagnetic coil;

a movable armature assembly of magnetic material;

suspension spring means within said bore for supporting said movable armature within said bore adjacent to one end of said magnetic pole piece for axial movement within said electromagnetic coil, so that an axial gap is formed between a first portion of said armature assembly and said magnetic pole piece and a radial gap is formed between a second portion of said armature assembly and a first portion of said housing; means for causing the force imparted to said movable armature by the application of a current to said electromagnetic coil to be substantially constant irrespective of the magnitude of said second gap for a variation in said second gap over a prescribed range; and a fluid valve assembly having an inlet port, an outlet port, and valve means, coupled between said inlet port and said outlet port, and being coupled to said armature assembly, for controlling fluid continuity between said inlet port and said outlet port in accordance with the movement of said armature assembly in response to the application of electrical current to said electromagnetic coil.

2. A solenoid device according to claim 1, wherein said valve means comprises a chamber to which said inlet port and said outlet port are coupled, a poppet attached to said armature assembly, and a tube member, a first end of which extends from said chamber toward said outlet port, and a second end of which is arranged in proximity of said poppet so as to be closed by said poppet in response to said poppet being urged against said tube member by movement of said armature assembly in a first axial direction and so as to be opened by said poppet in response to said poppet being urged away from said tube by movement of said armature in a second axial direction.

3. A solenoid device according to claim 2, wherein said valve means further includes means for causing said tube to be aligned with said poppet so that the second end of said tube is sealingly engaged by said poppet when said poppet is urged against said second end of said tube.

4. A solenoid device according to claim 3, wherein said tube aligning means comprises means for fixedly establishing the condition of alignment of said tube with respect to said poppet in response to an initial urging of said poppet against said second end of said tube.

5. A rectilinear motion proportional solenoid device comprising:

a housing, containing an electromagnetic coil which has a longitudinal axis and a bore coaxial therewith, said coil producing a magnetic field, said housing containing magnetic material for providing a flux path for said magnetic field;

a magnetic pole piece disposed within the bore of said electromagnetic coil and through which the flux path of said magnetic field passes;

a movable armature assembly of magnetic material through which the flux path of said magnetic field passes;

suspension springs, at least one of which is disposed adjacent to one end of said bore, which support said movable armature within said bore adjacent to one end of said magnetic pole piece for axial movement within said electromagnetic coil, so that an axial gap is formed between a first portion of said armature assembly and said magnetic pole piece and a radial gap is formed within said bore between a second portion of said armature assembly and a first portion of said housing; and wherein said movable armature and said magnetic pole piece are configured to cause the force imparted to said movable armature by the application of a current to said electromagnetic coil to be substantially constant, irrespective of the magnitude of said axial gap for a variation in said axial gap over a prescribed range, and to divert a portion of the magnetic flux that passes through said armature and said pole piece in the direction of said axis through a low reluctance magnetic path that substantially bypasses said axial gap.

6. A solenoid device according to claim 5, wherein said magnetic pole piece includes a first pole piece region spaced apart from said armature assembly by said axial gap and wherein said constant force causing means comprises a second pole piece region adjacent to said axial gap.

7. A solenoid device according to claim 6, wherein said second pole piece region has a varying thickness in the direction of said longitudinal axis.

8. A solenoid device according to claim 7, wherein said second pole piece region is spaced apart from said first pole piece region by a further gap which is transverse to the direction of movement of said armature assembly.

9. A solenoid device according to claim 5, wherein said armature assembly is generally cylindrically configured and said housing comprises a base member having a first generally cylindrically configured cavity in which said armature assembly is supported for axial movement therein, said cavity having a first cylindrical sidewall portion containing magnetic material, corresponding to said first portion of said housing, spaced apart from a first cylindrical portion of said armature assembly so as to define therebetween said radial gap.

10. A solenoid device according to claim 9, further including a generally cylindrical member of non-magnetic material extending from said first cylindrical sidewall of said first cavity toward and coupled with said magnetic pole piece, and wherein said suspension spring means comprises a pair of suspension springs supporting said armature assembly for axial displacement within said member of non-magnetic material and said first cavity.

11. A solenoid device according to claim 5, wherein said magnetic pole piece includes a first generally cylindrically configured pole piece region spaced apart from an end region of said armature assembly by said axial gap, and a second, generally cylindrically configured pole piece region corresponding to said magnetic flux diverting means adjacent to said axial gap.

12. A solenoid device according to claim 5, further including adjustable spring bias means, coupled with said magnetic pole piece, for imparting a controllable axial force to said armature assembly.

13. A solenoid device according to claim 5, further including a fluid valve assembly having an inlet port, an outlet port, and valve means, coupled between said inlet port and said outlet port, and being coupled to said armature assembly, for controlling fluid continuity between said inlet port and said outlet port in accordance with the movement of said armature assembly in response to the application of electrical current to said electromagnetic coil.

14. A rectilinear motion proportional solenoid assembly comprising a cylindrical housing accommodating an electromagnetic coil having a longitudinal bore, said housing containing magnetic material for providing a flux path for a magnetic field produced by said coil, a generally cylindrical magnetic pole piece disposed within said bore, a movable armature assembly of magnetic material through which said flux path passes, said movable armature assembly being supported for movement within the bore of said coil along a longitudinal axis thereof by a pair of suspension springs, at least one of said suspension springs being disposed adjacent to one end of said longitudinal bore, an axial gap formed within said longitudinal bore between one end of said pole piece and said armature, a radial air gap being formed within said longitudinal bore between said armature and said housing, and wherein said pole piece includes a magnetic flux shunting region adjacent to said axial gap for diverting therefrom a portion of magnetic flux passing along said bore and thereby effectively causing the force imparted to the movable armature by the application of a current to the electromagnetic coil to be substantially constant irrespective of the magnitude of said axial gap for a variation in said axial gap over a prescribed range.

15. A rectilinear motion proportional solenoid assembly according to claim 14, wherein one of said suspension springs is disposed outside of said longitudinal bore.

16. A rectilinear motion proportional solenoid assembly according to claim 15, wherein one of said suspension springs is disposed within said longitudinal bore.

17. A rectilinear motion proportional solenoid assembly according to claim 14, wherein one of said suspension springs is disposed within said longitudinal bore.

* * * * *

UNITED STATES PATENT AND TRADEMARK OFFICE

CERTIFICATE OF CORRECTION

PATENT NO. : 5,301,921

DATED : April 12, 1994

INVENTOR(S) : Viraraghavan S. Kumar

It is certified that error appears in the above-indentified patent and that said Letters Patent is hereby corrected as shown below:

In Column 4, at line 59, change "end portion 2" to --end portion 28--.

Signed and Sealed this

Twentieth Day of September, 1994

*Attest:*

BRUCE LEHMAN

*Attesting Officer*

*Commissioner of Patents and Trademarks*